United States Patent [19]

Matumoto et al.

[11] Patent Number: 5,016,276

[45] Date of Patent: May 14, 1991

[54] COMMON CRYPTOKEY GENERATION SYSTEM AND COMMUNICATION SYSTEM USING COMMON CRYPTOKEYS

[75] Inventors: Tutomu Matumoto; Hideki Imai, both of Yokohama, Japan

[73] Assignee: Kabushiki Kaisya Advance, Tokyo, Japan

[21] Appl. No.: 518,317

[22] Filed: May 7, 1990

Related U.S. Application Data

[63] Continuation of Ser. No. 390,478, Aug. 7, 1989, abandoned, which is a continuation of Ser. No. 174,161, Mar. 28, 1988, abandoned.

[30] Foreign Application Priority Data

Jul. 31, 1986 [JP] Japan .................................. 61-178652
Oct. 24, 1986 [JP] Japan .................................. 61-251896

[51] Int. Cl.$^5$ ............................................. H04L 9/02
[52] U.S. Cl. ........................................ 380/45; 380/44; 380/47
[58] Field of Search ................................. 380/23-25, 380/28, 30, 21, 45, 47

[56] References Cited

U.S. PATENT DOCUMENTS

| | | | |
|---|---|---|---|
| 3,962,539 | 6/1976 | Ehrsam et al. | |
| 4,386,233 | 5/1983 | Smid et al. | 380/25 |
| 4,438,824 | 5/1984 | Mueller-Schloer | 380/25 |
| 4,458,109 | 7/1984 | Mueller-Schloer | 380/25 |
| 4,484,025 | 11/1984 | Ostermann et al. | 380/28 |
| 4,578,530 | 3/1986 | Zeidler | 380/24 |
| 4,656,474 | 4/1987 | Mollier et al. | 380/23 |

FOREIGN PATENT DOCUMENTS 59-45269 5/1984 Japan.

OTHER PUBLICATIONS

R. Blom, "An Optimal Class of Symmetric Key Generation Systems," Lecture Notes in Computer Science, Advances in Cryptology, 1985, pp. 335-338.
R. Blom, "Non-Public Key Distribution," Advances in Cryptology, Proceedings of Crypto 82, Plenum Press, New York, N.Y., 1983, pp. 231-236.
B. Schanning, "Data Encryption with Public Key Distribution," Eascon '79 Record, vol. 3, IEEE Publication 79CH 1476-1 AES, pp. 653-660.
Japanese Patent Document No. 61-166240 (Appl. No. 60-56750), published on Jul. 26, 1986, Patent Abstracts of Japan, vol. 10, No. 370, Dec. 10, 1986.
Imai et al., "Cryptography," Journal of the Television Society, vol. 39, No. 12 (1985), pp. 1140-1147.
A. G. Konheim, Cryptography, A Primer, John Wiley & Sons, New York, 1981, pp. 285-293.
C. H. Meyer et al., Crytography: A New Dimension in Computer Data Security, John Wiley & Sons, New York, 1982, pp. 300-330.
D. E. Denning, Cryptography and Data Security, Addison-Wesley Publishing Company, Reading, Mass., 1982, pp. 173-179.

(List continued on next page.)

*Primary Examiner*—Thomas H. Tarcza
*Assistant Examiner*—Tod Swann
*Attorney, Agent, or Firm*—Finnegan, Henderson, Farabow, Garrett & Dunner

[57] ABSTRACT

A system for generating a cryptokey (k) to be shared among entities (A, B) engaged in communications, in particular one known as the key predistribution system. Indentifiers ($y_A$, $y_S$) for the entities engaging in communications under a center and a center algorithm (G) which only the center knows are generated, then secret algorithms ($x_A$, $X_B$) distinct to each entity are generated on added to IC cards or other cipher generation means (2, 3). A cipher generation means (2, 3) is provided for each entity. The identifiers ($y_B$, $y_A$) of the other entity are applied to compute a cryptokey, whereby a common cryptokey is generated.

Also disclosed is a system for communications using the above shared cryptokey.

25 Claims, 12 Drawing Sheets

OTHER PUBLICATIONS

D. W. Davies et al., Security for Computer Networks, John Wiley & Sons, New York, 1984, pp. 156–168 and 231–233.

Matsumoto et al., "Asymmetric Cryptosystems Using Obscure Expressions in Ciphering Conversion," Papers of 1983 National Conference of Systems Division of Society of Electrical Communications, Sep., 1983, No. S8-5, pp. 1-469 to 1-470.

Matsumoto et al., "On Multivariate Polynomial Tuple Asymmetric Cryptosystems," Feb. 7, 1986, 1986 Code and Data Security Symposium Materials E2, Code and Data Security Research Conference, Special Committee on Data Security of Society of Electronic Communications.

Matsumoto et al., "A Cryptographically Useful Theorum on the Connection Between Uni and Multivariate Polynomials," The Transactions of the IECE of Japan, vol. E68, No. 3, Mar. 1985, pp. 138–146.

Imai et al., "Algebraic Methods for Constructing Asymmetric Cryptosystems," Third International Conference on Applied Algebra, Algebraic Algorithms and Symbolic Computation, Error Correcting Codes, Jul. 15–19, 1985, Grenoble, France, pp. 108–119.

Koh et al., Coding Theory, Corona Publishing Company, Ltd., Tokyo, Japan, 1975, pp. 108–110.

Fig. 5
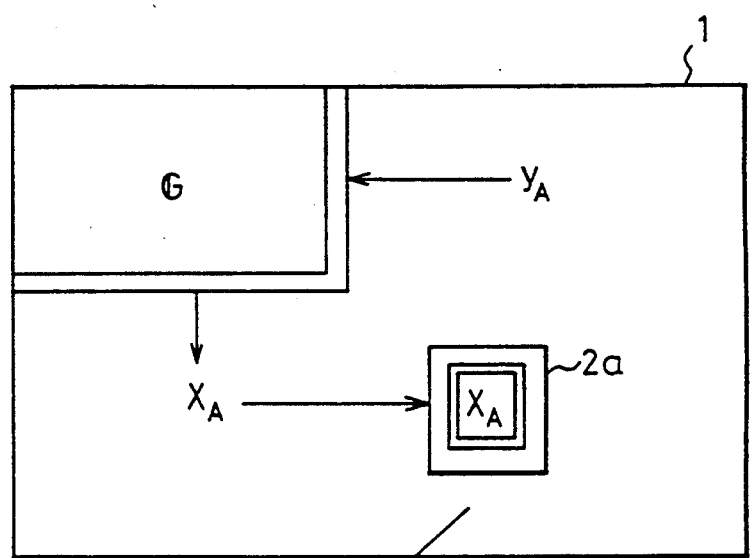
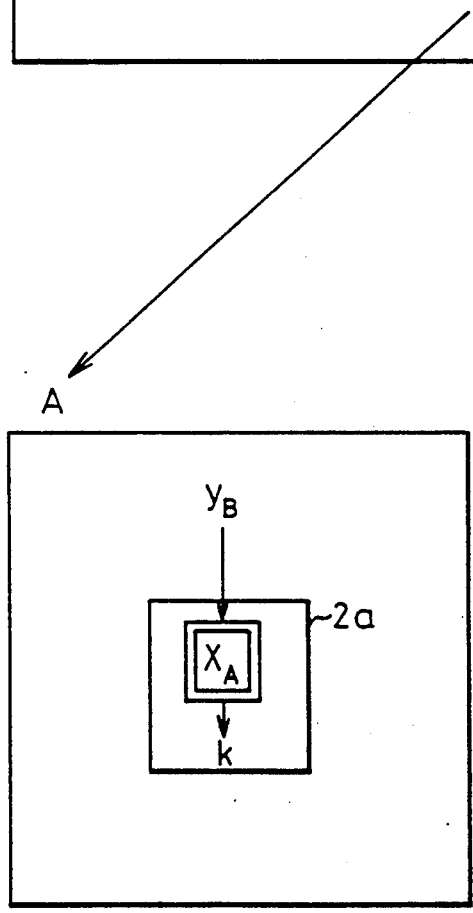

COMMON CRYPTOKEY GENERATION SYSTEM AND COMMUNICATION SYSTEM USING COMMON CRYPTOKEYS

This application is a continuation of application Ser. No. 390,478, filed Aug. 7, 1989, which is a continuation of application Ser. No. 174,161, filed Mar. 28, 1988, both now abandoned.

1. Technical Field

The present invention relates to a communication system using text coded using cryptokeys. More particularly, it relates to a cryptokey generation system which is able to maintain a high level of privacy and security, is easy to operate, and enables common use by a plurality of entities. The invention further relates to a communication system enabling communication by cryptotext using such common (shared) cryptokeys.

Diverse entities are covered by the present invention, such as human beings, apparatuses, machines, software, and the systems of which these form composite elements. Therefore, the cryptokey generation apparatus of the present invention generates cryptokeys able to be commonly used by these entities. Further, the communications system of the present invention may be applied to various forms of communication using the above-mentioned shared keys, for example, communication between a CPU chip and ROM chip, communications among IC cards, terminals, bank centers, and humans, communications among communication equipment of moving bodies, communications among personal radios, communications among telephones, communications among people, communications among host computers, terminals, and data bases, communications among computer in parallel computers, communications between CATV broadcasting stations and subscribers, satellite broadcasts, and other communications systems.

2. Background Art

Various enciphering techniques have been proposed in the past with regard to data security, that is, maintenance of secrecy of data and establishment of privacy, authentication of entities, authentication of communication parties, and the like.

Enciphering techniques may be roughly classified into common key enciphering systems and public key systems (Imai et al, "Cryptography", Journal of the Television Society, vol. 39, No. 12 (1985), pp. 1140 to 1147). In the common key enciphering system, a secret common key is determined in advance between the message sender and receiver. The sender enciphers plain test using the common key and transmits the enciphered text. The receiver deciphers the same by the common key to return it to plain text. The public key system is generally known as the public key distribution system, the public key enciphering system, and the public key digital signature system. Details on these enciphering techniques are available in (1) A. G. Konheim, "Cryptography: A Primer", Wiley, New York, 1981, (2) C. H. Meyer et al, "Cryptography", Wiley, New York, 1982, (3) D. E. Denning, "Cryptography and Data Security", Addison-Wesley, Reading, 1982, (4) D. W. Davies et al, "Security for Computer Networks", Wiley, Chichester, 1984, etc.

The afore-mentioned common key enciphering system is the most popular, but since the entities share the cryptokey with all envisioned communication parties by other enciphering means or physical means, when there are a large number of entities, problems arise in distribution of the key. That is, it is desirable to frequently change the common key, so tremendous problems arise when there are a large number of envisioned communication parties, making this unsuitable for cipher communications with large numbers of unspecified parties.

The afore-mentioned public key system is employed to solve the above-mentioned problem in key distribution. Explaining its gist, the entities prepare public data based on their own secret data and record the same in public files which freely allow reading, but are carefully controlled with regard to writing and erasure. At the time of transmission, they compute the cryptokey to be shared from their own secret data and the other party's public data. According to this system, in transmission, any entity can share the cryptokey by referring to the public files, making this suitable for application to cipher communications with large numbers of unspecified parties. Despite this advantage, a problem arises in that the system requires public files or a corresponding organization for management of public data. Further, considerable work is entailed when an entity refers to the public data of another party, and therefore the operability is poor.

The security achieved by cipher texts depends strongly on the factor that the entities party to the communications have the same cryptokey and entities other than those parties do not have the cryptokey, and thus a truly secure, efficient cryptokey sharing system is yet to be achieved.

SUMMARY OF THE INVENTION

The present invention has as an object the provision of a shared cryptokey generation system enabling an acquisition of a highly secret cipher text by a simple operation.

Further, the present invention has as an object the provision of a communication system enabling transmission of cipher texts using a cryptokey generated by the generation system referred to above.

According to a first aspect of the present invention, there is provided a shared cryptokey generation system provided with a secret algorithm generation apparatus, which, under requirements determined among a plurality of entities sharing a cryptokey, generates a center algorithm held secret by a center alone and applies identifiers, determined individually for each of the above-mentioned plurality of entities, made public, and used semifixedly, to the above-mentioned center algorithm to produce secret algorithms distinct for each of the above-mentioned plurality of entities and a plurality of cryptokey generation means which have memories which store at least the above-mentioned secret algorithms and which are connected to the secret algorithm generation apparatus during the generation of secret algorithms in the above-mentioned secret algorithm generation apparatus, store the secret algorithms of the corresponding entities in the above-mentioned memory, and apply the identifiers of the plurality entities to receive or send cipher text to the said secret algorithms to thereby generate a common cryptokey.

Optimally, the above-mentioned secret algorithm generation apparatus can be provided with a plurality of first center algorithm generation apparatuses which operate mutually independently to respectively generate independent first center algorithms and an apparatus for combining the plurality of first center algorithms generated by the said first secret algorithm generation apparatuses and generating the distinct secret algorithm for each entity based on the combined center algorithm.

According to a second aspect of the present invention, there is provided a communication system using a share cryptokey which is provided with the above-mentioned secret algorithm generation apparatus, the above-mentioned plurality of cryptokey generation means, and at least one pair of sending and receiving entities connected via a transmission system, the sender entity cooperating with the above-mentioned cryptokey generation means and having a means for enciphering plain text using the common cryptokey from said cryptokey generation means, the receiver entity cooperating with the above-mentioned cryptokey generation means and having a means for deciphering into plain text the cipher text sent via the above-mentioned transmission system from the above-mentioned sender entity based on the common cryptokey from said cyrptokey generation means, and which transmits cipher text based on the above-mentioned common cryptokey.

BRIEF DESCRIPTION OF THE DRAWINGS

FIG. 5 is a view showing an example of the use of an IC card as the code generation means in FIG. 1 covering the entry of an entity A in the network, the issuance of an IC card for the entity A, and the computation of the cryptokey k for the entity A;

DETAILED DESCRIPTION OF THE PREFERRED EMBODIMENTS

Figure 1:
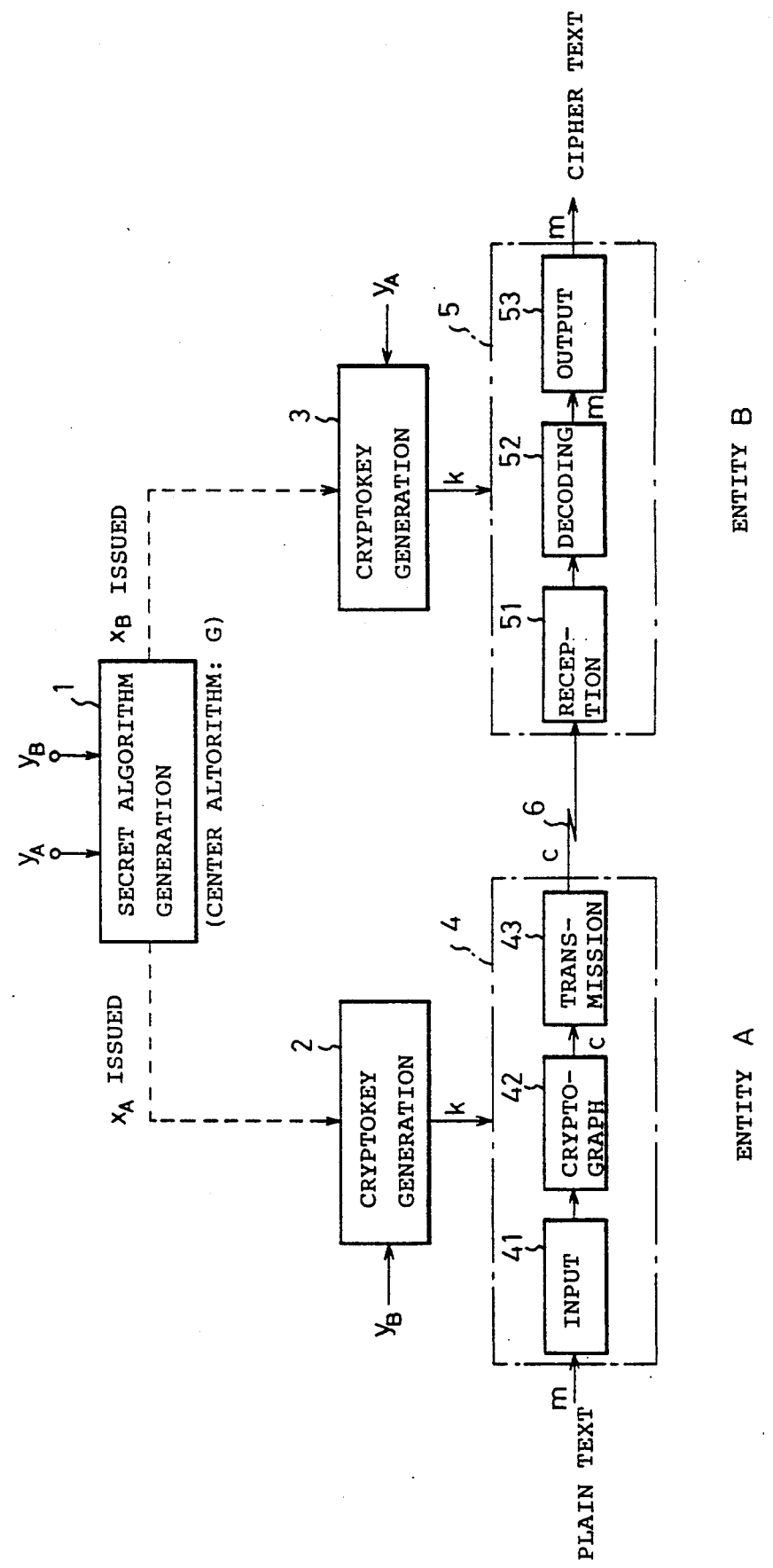
FIG. 1 is a block diagram of a shared cryptokey generation system and a communication system using the shared cryptokey in accordance with a first preferred embodiment of the present invention.

FIG. 1 illustrates a shared cryptokey generation system and a communication system using the synthesized shared cryptokey in accordance with preferred embodiment of the present invention.

FIG. 1 illustrates the case where there are two entities, A and B. Entity A and entity B are connected via a communication circuit 6, e.g., a public line. The sender entity, for example, entity A, is provided with a cipher text generation means 4 comprised of a means 41 for inputting the plain text to be transmitted, a means 42 for enciphering the plain text which is input based on a later-mentioned shared cryptokey k, and a means 43 for transmitting the cipher text. The receiver entity B is provided with a cipher text deciphering means 5 comprised of a means 51 for receiving the cipher text via the public line 6 and judging that it is communication text addressed to itself, a means 52 for deciphering the received cipher text to plain text using the shared, key k, and a means 53 for outputting the deciphered plain text. The construction of the cipher text generation means 4 and cipher text deciphering means 5 are known in the prior art. The enciphering means 42 and the deciphering means 52 may be realized by, for example, those disclosed in FIG. 8 of Japanese Examined Patent Publication (Kokoku) No. 59-45268 (claiming priority of Feb. 24, 1975, based on U.S. patent application Ser. No. 552,684).

Figure 2:
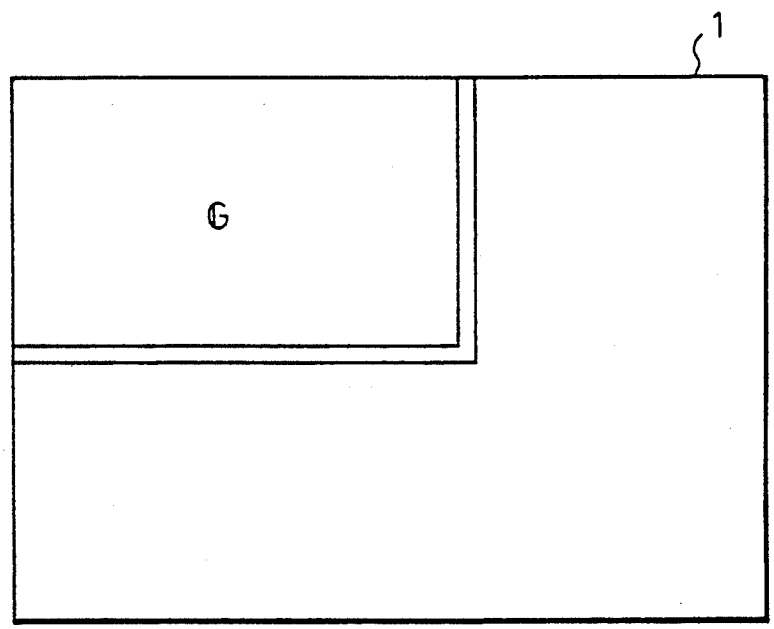
FIG. 2 is a view showing the generation of a center algorithm G in a secret algorithm generation apparatus 1 provided in the center of FIG. 1.

The center is provided as a management organization, with an apparatus 1 for generation of secret algorithms. This issues secret algorithms via cryptokey generation means 2 and 3, which issue a shared cryptokey k for the entities A and B, respectively, through e.g., IC cards. That is, the secret algorithm generation apparatus 1 receives as an input the identifiers of entities A and B, for example, $y_A$ and $y_B$, which encipher in a predetermined format their names or addresses, generates the center algorithm G as shown in FIG. 2, then holds the algorithm G secret and issues secret algorithms $X_A$ and $X_B$. The identifiers $y_A$ and $y_B$ are, for example, input via ten-keys.

The secret algorithms $X_A$ and $X_B$ of the entities A and B are defined as follows using their own respective identifiers $y_A$ and $y_B$:

$$X_A = G(y_A) \quad (1\text{-}1)$$

$$X_B = G(y_B) \quad (1\text{-}2)$$

Figure 3:
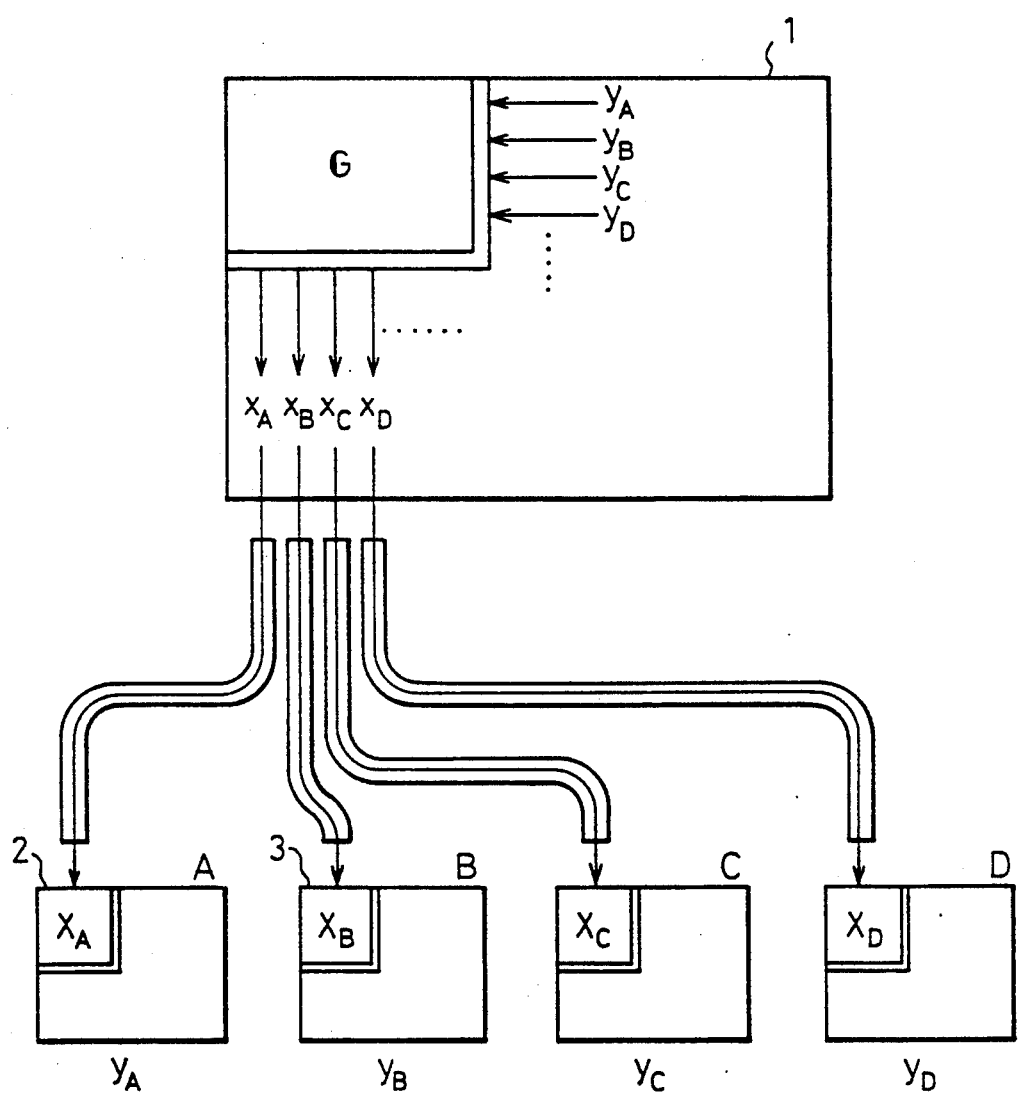
FIG. 3 shows the generation and distribution of secret algorithms for the entities using identifiers in the center of FIG. 1.

The secret algorithm generation apparatus 1 has fitted to it cryptokey generation means 2 or 3 with built-in CPUs and memories able to perform reading/writing during the generation of the above-mentioned secret algorithms, e.g., IC cards. The secret algorithms are stored in the memories of the corresponding cryptokey generation means and issued from there. FIG. 3 illustrates the state of issuance of secret algorithms $X_A$ to $X_D$ corresponding to the entities A to D. As is clear, for the entities C and D, the following secret algorithms $X_C$ and $X_D$ are issued using their respective own identifiers $y_C$ and $y_D$:

$$X_C = G(y_C) \quad (1\text{-}3)$$

$$X_D = G(y_D) \quad (1\text{-}4)$$

Each entity, of course stores its secret algorithm secretly.

An algorithm as used herein to describe the present invention means a method of computation noted in a predetermined language. Computer programs in the common sense and data, logic circuits, graphs, tooling machines, Petri nets known as models of dynamic analysis of distribution systems, LSI patterns, etc. are all types of algorithms in the present invention.

Figure 4A:
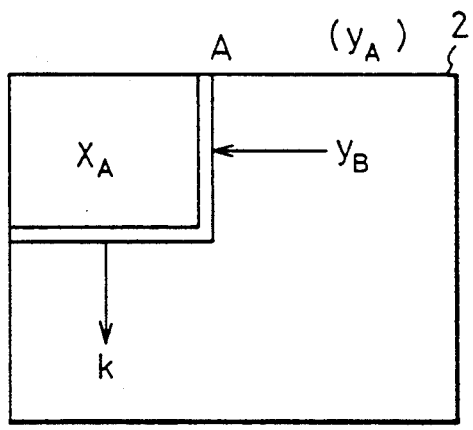
FIGS. 4a and 4b illustrate generation of a common cryptokey by the respective cryptokey generation means of entities A and B.
Figure 4B:
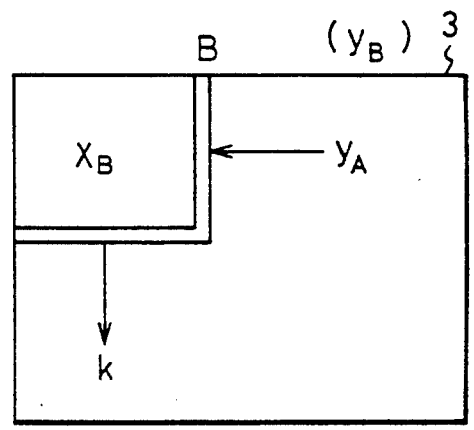

The cryptokey generation means 2 and 3 in which the secret algorithms $X_A$ and $X_B$ issued as mentioned above are loaded are equipped at their respective corresponding own entities. When the entities A and B desire to share a cryptokey k, as shown in FIG. 1 and FIG. 4(a) and (b), the identifier of the other party to share the key, i.e., $y_B$ for the entity A and $y_A$ for the entity B, is input at the cryptokey generation means 2 and 3 provided to the entities via the keyboards, etc., at the entities. The cryptokey generation means generate the shared cryptokey k as follows by the built-in CPUs based on the secret algorithms stored in the memories and the input identifiers:

$$k = X_A (y_B) \quad (2\text{-}1)$$

$$k = X_B (y_A) \quad (2\text{-}2)$$

The cipher text generation means 4 and the cipher text deciphering means 5 use the shared cryptokey k for enciphering or deciphering.

The algorithms G, $X_A$, $X_B$, ... must be determined so as to enable computation of the same cryptokey k by the above procedure.

By the constitution mentioned above, the secret algorithms converted by the center algorithm known only to the center are distributed to the entities, thus maintaining secrecy. On the other hand, the entities are equipped with cryptokey generation means in which the secret algorithms are loaded, for example, IC cards, and need merely to input the identifier of the other party, so the operation is extremely easy. In this case, the cryptokey k issued based on the identifier of the other party is used for enciphering and deciphering, so secrecy is improved.

Further, since there are several sets of identifiers and secret algorithms, for example, $(y_A, X_A)$, $(y_B, X_B)$, and $(y_C, X_C)$, finding a secret algorithm for another identifier, for example, $X_D$ for $y_D$, requires a massive amount of computation and is practically unworkable, which is in general desirable. As a result the center algorithm G cannot in practice be computed from just $(y_A, X_A)$, $(y_B, X_B)$, $(y_C, X_C)$, ....

As another embodiment of the present invention, if the above-mentioned secret algorithms are accommodated in a computer physically protected by one or a plurality of IC cards 2a, etc. as shown in FIG. 5, it is possible to construct a cryptokey sharing system having an even higher level of security.

In this case, the entities cannot take out their own secret algorithms. Even the action of several entities colluding and assembling their secret algorithms to derive the center algorithm G or an algorithm equivalent to G can be prevented. However, in the present invention, G is comprised so that security is maintained even if a plurality of secret algorithms are used, so even if the physical security of the IC cards, etc., is broken, the system as a whole is secure.

Further, the procedure for generating the shared cryptokeys may be performed internally in the IC cards, etc., in addition to being performed by simply inputting the identifiers, so the burden of work of the entities for sharing the cryptokeys is cut down tremendously.

In FIG. 5, an entity A applies to the center for entry into the network. In response, an IC card 2a in which a secret algorithm is embedded is issued via a secret algorithm generation apparatus, and provided to the entity A. The identifier $y_B$ of the entity B is then input and a shared cryptokey k is generated. FIG. 5 shows the example of a secret algorithm embedded in a single IC card, but the secret algorithm can be arbitrarily divided and separated in IC cards or magnetic cards, magnetic tape, bar codes, optical memories, IC memories, or floppy disks, and any other data storage medium and/or computer systems, IC cards, one-chip microcomputers, computing processors, and modems comprising the same, and any other apparatuses having computing abilities.

Next, an example will be provided of the method of preparation of the center algorithm G and secret algorithms.

First, consider the case of two entities A and B sharing a cryptokey.

Figure 6:
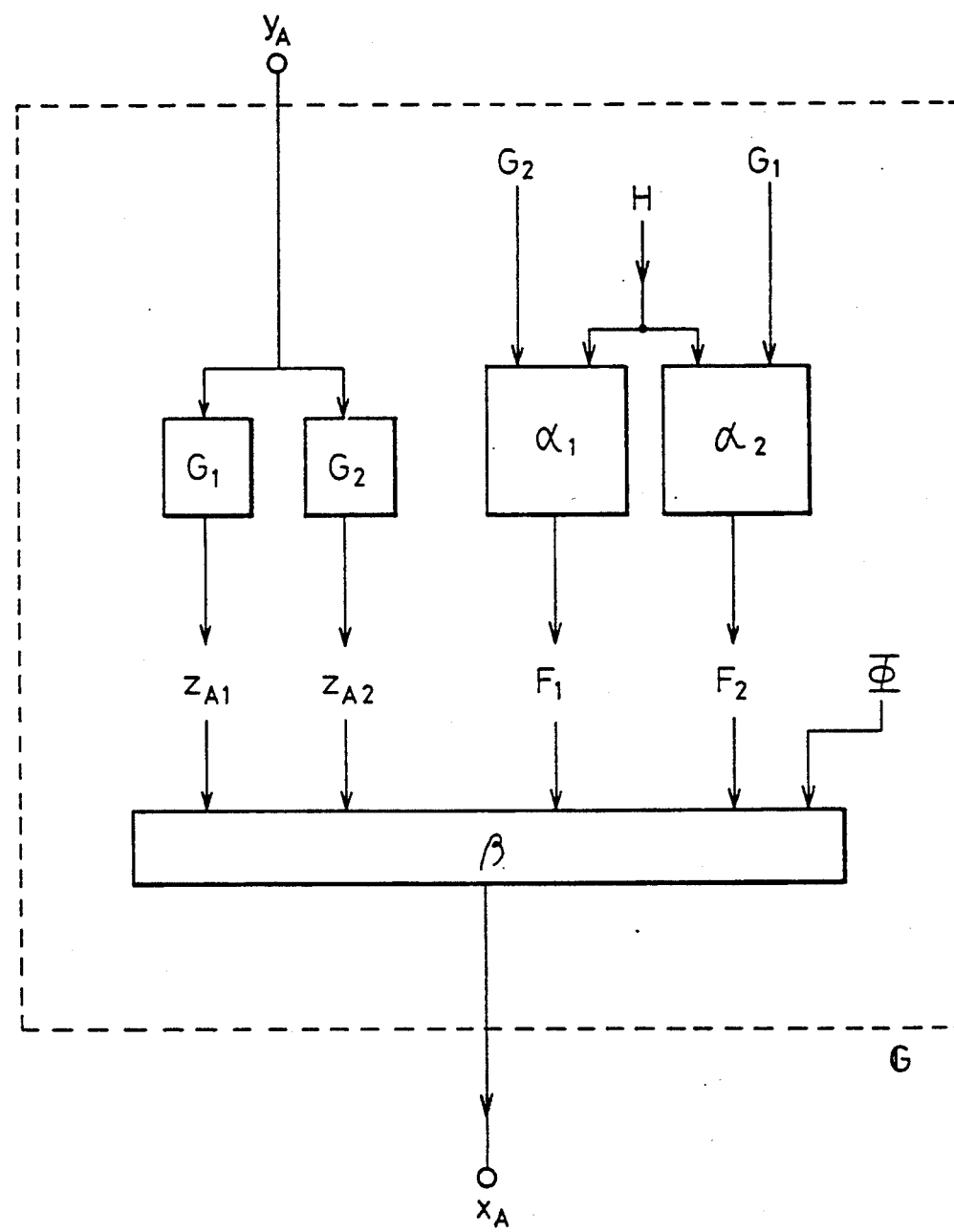
FIGS. 6 and 7 are views showing one example of the generation of a center algorithm and a secret algorithm in the case of two entities.

FIG. 6 shows a method of construction of the center algorithm G. For G, one first prepares the one-input, one-output algorithms $G_1$ and $G_2$ and the two-input, one-output algorithms H and $\phi$. $\phi$ expresses a correspondence function.

One prepares the algorithms $\alpha_1$, $\alpha_2$, and $\beta$ which handle the algorithms $G_1$, $G_2$, H, and $\phi$, then synthesizes $G_2$ and H from $\alpha_1$ to prepare the algorithm $F_1$ and synthesizes $G_1$ and H from $\alpha_2$ to prepare the algorithm $F_2$.

Figure 7:
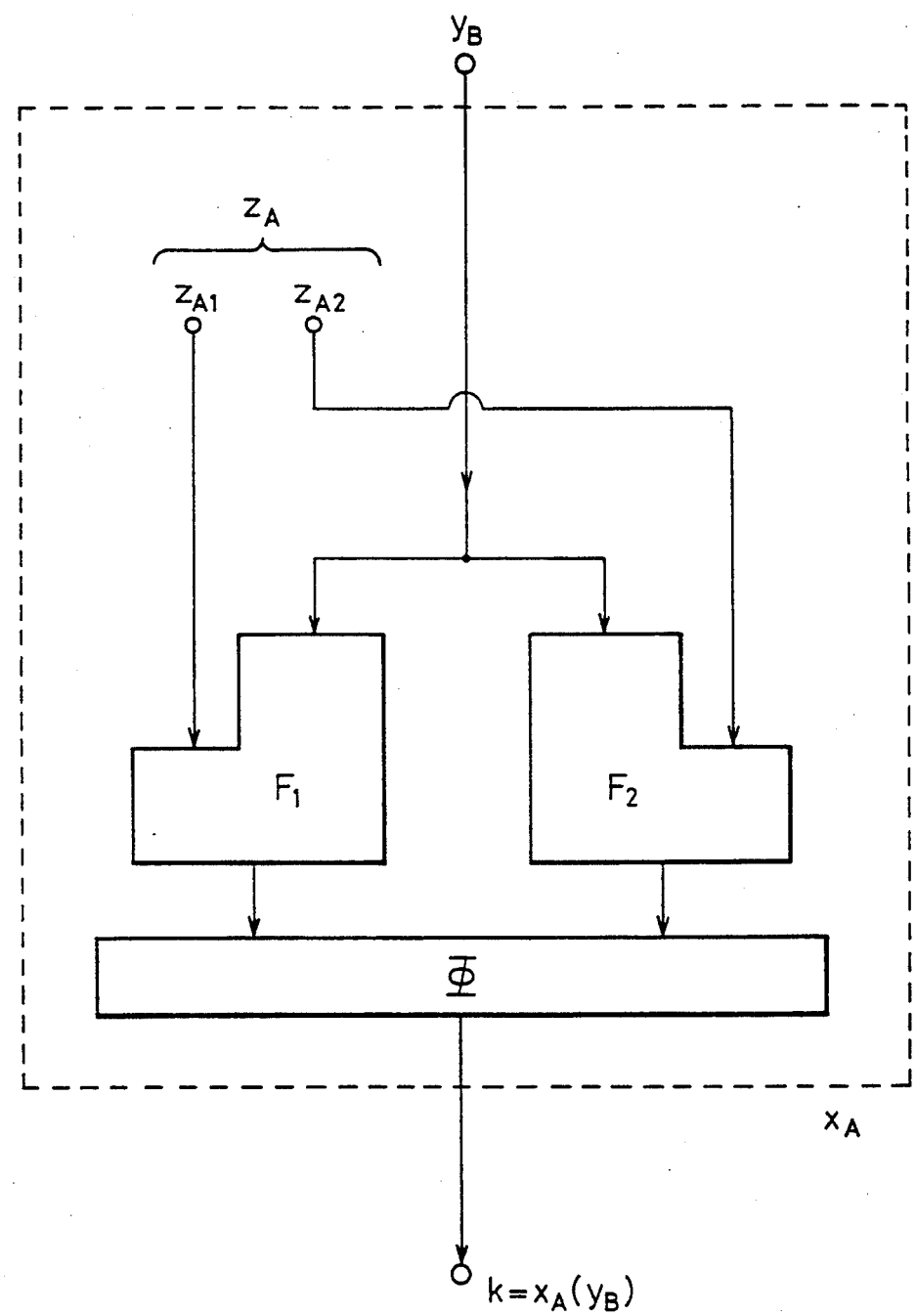

Next, $G_1$ and $G_2$ are applied to the identifier $y_A$ of the entity A, which produces $Z_{A1}$ and $Z_{A2}$. The above-mentioned algorithms $Z_{A1}$, $Z_{A2}$, $F_1$, $F_2$, and $\phi$ are combined by the algorithm $\beta$ as shown in FIG. 7, and the secret algorithm $X_A$ of the entity A is output.

The combination performed by the algorithms $\alpha_1$ and $\alpha_2$ in FIG. 6 is known as the algorithm combination method. $F_1$ and $F_2$ are expressed by the following equations as combination algorithms:

$$F_1 = H(\cdot, G_2(*)) \quad (3\text{-}1)$$

$$F_2 = H(G_1(\cdot), *) \quad (3\text{-}2)$$

The $\cdot$ and $*$ each indicate identifiers (parameters). Here, the algorithms H, $G_1$, and $G_2$ cannot in practice be derived from the combination algorithms $F_1$ and $F_2$ and it is difficult to learn the contents of $F_1$ and $F_2$. That is, this combination method produces obscure algorithms.

The secret algorithm $X_A$ of the entity A of FIG. 7 is comprised of the center algorithm G of FIG. 6 and the secret algorithm $X_B$ of the entity B, which are comprised in the same way. The correct functioning of the algorithm $X_A$ can be confirmed as follows:

$$\begin{aligned} X_A(y_B) &= \phi(F_1(Z_{A1}, y_B), F_2(y_B, Z_{A2})) \\ &= \phi(H(G_1(y_A), G_2(y_B)), H(G_1(y_B), G_2(y_A))) \\ &= \phi(H(G_1(y_B), G_2(y_A)), H(G_1(y_A), G_2(y_B))) \\ &= \phi(F_1(Z_{B1}, y_A), F_2(y_A, Z_{B2})) \\ &= X_B(y_A) \end{aligned} \quad (4)$$

Other obscure algorithm combination methods are disclosed in (1) Matsumoto et al, "Asymmetric Cryptosystem Using Obscure Expressions of Enciphering Conversion", Papers of 1983 National Conference of Systems Division of Society of Electronic Communications, September 1983, No. S8-5, pp. 1-469 to 1-470 (in Japanese), (2) Matsumoto et al, "On Multivariate Polynomial Tuple Asymmetric Cryptosystems", Feb. 7, 1986, 1986 Code and Data Security Symposium Materials E2, Code and Data Security Research Conference, Special Committee on Data Security of Society of Electronic Communications (in Japanese), (3) Matsumoto et al, "A Cryptographically Useful Theorum on the Connection Between Uni and Multivariate Polynomials", The transaction of the IECE of Japan, Vol. E68, No. 3, pp. 139 to 146, March 1985, (4) Imai et al, "Algebraic Method for Constructing Asymmetric Cryptosystems", 3rd International Conference on Applied Algebra, Algebraic Algorithms and Symbolic Computations, Error Correcting Codes (July 15 to 19, 1985, Grenoble, France), Springer Verlag, etc. These may also be applied.

Next, a specific example of use of the center algorithm G and the matrix of secret algorithms $X_A$, $X_B$, etc., for the two entities A and B is provided.

The set comprised of all of the n row and m column matrixes on the commutative ring R is expressed as $\mu_R$ (n, m). For R, use may be made, for example of the residue-class ring $Z_Q = \{0, 1, 2, \ldots q-1\}$, etc., using the non-negative integer q as the modulo.

First, $G_1$, $G_2$, and $H \epsilon \mu_R$ (n, n) are selected and $F_1$ and $F_2 \epsilon \mu_R$ of the combination algorithms $$F_1 = HG_2^T \quad (5\text{-}1)$$

$$F_2 = G_1 H \quad (5\text{-}2)$$

are calculated. T in equation (5-1) shows a transposition.

Next, $Z_{A1}$, $Z_{A2}$, $Z_{B1}$, and $Z_{B2} \epsilon \mu_R$ (1, n) are calculated as follows for $y_A$, $y_B \epsilon \mu_R$ (1, n).

$$Z_{A1} = y_A G_1 \quad (6\text{-}1)$$

$$Z_{A2} = y_A G_2 \quad (6\text{-}2)$$

$$Z_{B1} = y_B G_1 \quad (6\text{-}3)$$

$$Z_{B2} = y_B G_2 \quad (6\text{-}4)$$

Therefore, $$\begin{aligned} Z_{A1} F_1 y_B^T &= (y_A G_1)(H G_2^T) y_B^T \\ &= y_A(G_1 H)(G_2^T y_B^T) \\ &= y_A(G_1 H)(y_B G_2)^T \\ &= y_A F_2 Z_{B2}^T \end{aligned} \quad (7)$$

That is, $$Z_{A1} F_1 y_B^T = y_A F_2 Z_{B2}^T \quad (8\text{-}1)$$

stands.

Similarly, the following equation stands:

$$Z_{B1} F_1 y_A^T = y_B F_2 Z_{A2}^T \quad (8\text{-}2)$$

Therefore, if the multiplication in the commutative ring R is expressed by *, the commutative of * and equations (8-1) and (8-2) give the following:

$$\begin{aligned} &(Z_{A1} F_1 y_B^T) * (y_B F_2 Z_{A2}^T) \\ &= (y_B F_2 Z_{B2}^T) * (Z_{A1} F_1 y_B^T) \\ &= (Z_{B1} F_1 y_A^T) * (y_A F_2 Z_{B2}^T) \end{aligned} \quad (9)$$

Here, if the algorithms G, $X_A$, and $X_B$ are determined as follows:

$$G(y_A) = X_A \quad (10\text{-}1)$$

$$G(y_B) = X_B \quad (10\text{-}2)$$

$$X_A(y_B) = (Z_{A1} F_1 y_B^T) * (y_B F_2 Z_{A2}^T) \quad (11\text{-}1)$$

$$X_B(y_A) = (Z_{B1} F_1 y_A^T) * (y_A F_2 Z_{B2}^T) \quad (11\text{-}2)$$

then from equation (9), $$X_A(y_B) = X_B(y_A) \quad (12)$$

stands.

Figure 8:
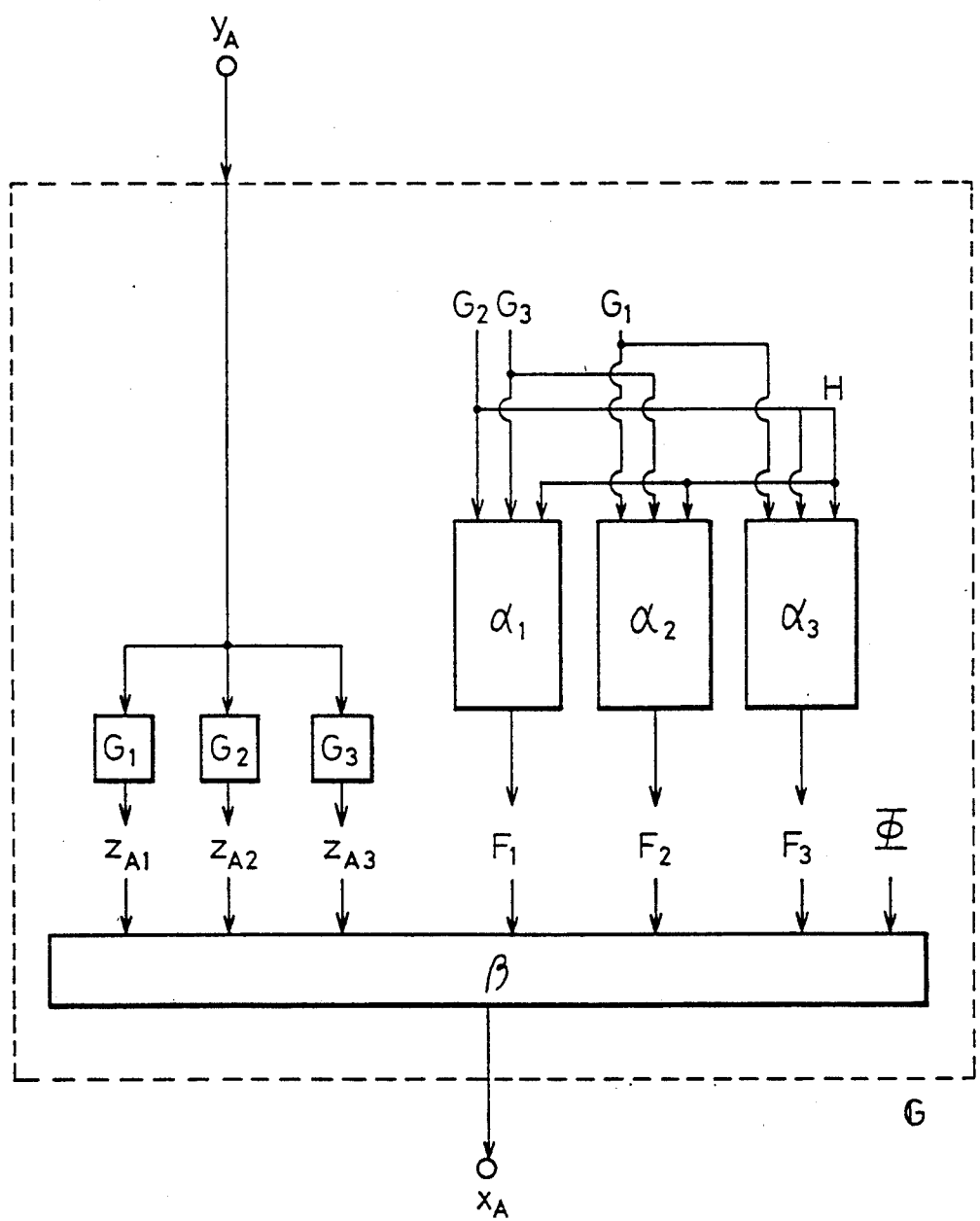
FIGS. 8 and 9 are views showing one example of the generation of a center algorithm and a secret algorithm in the case of three entities.
Figure 9:
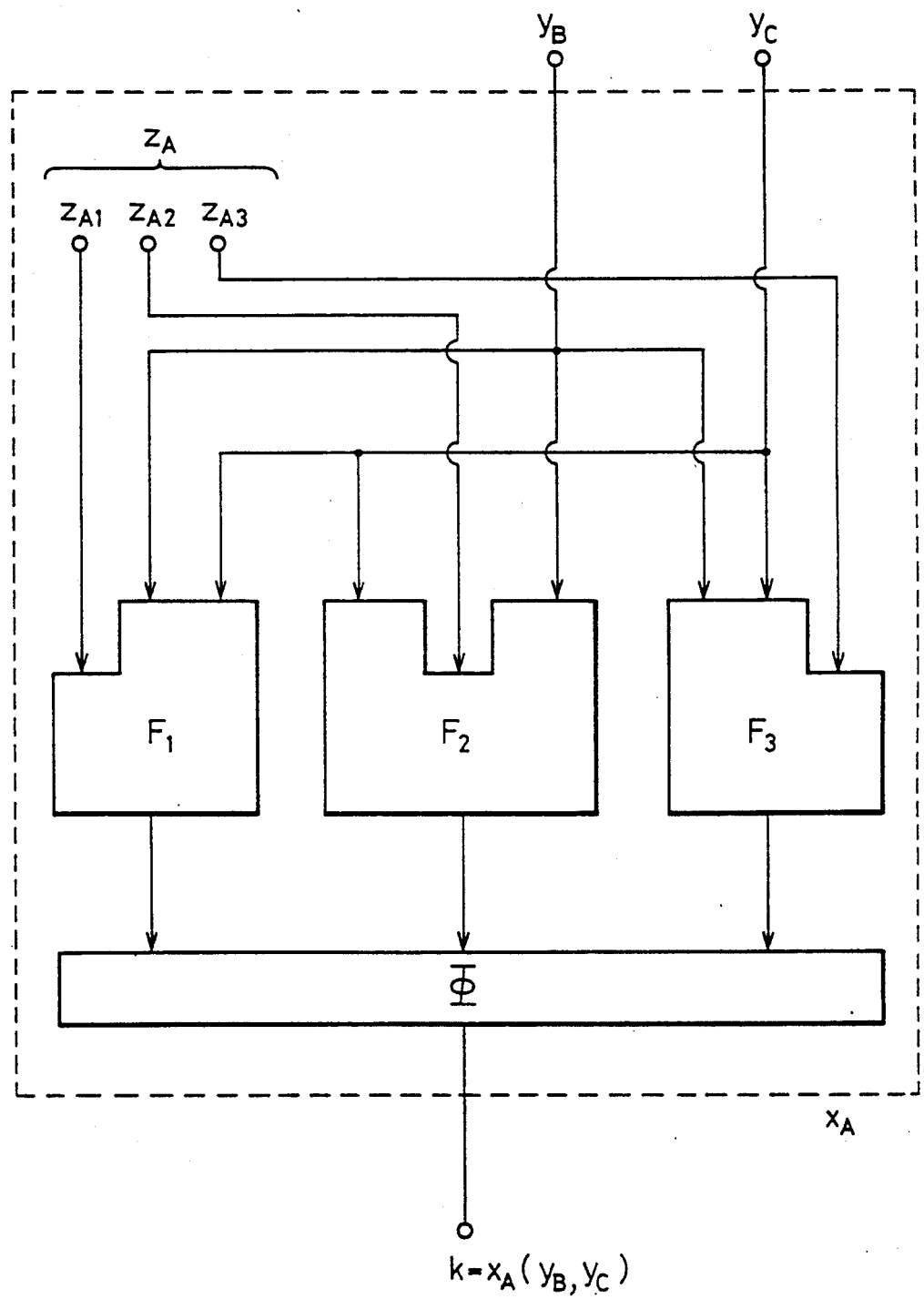

Even in the case of three or more entities, it is possible to form the center algorithm G and the secret algorithms $X_A$, $X_B$, $X_C$, ... in the same way as with two entities. An example of this, i.e., the case of three entities, is shown in FIG. 8 and FIG. 9.

Finally, while slightly different from the above, a specific example constituted by the same way of thinking as the above is shown for the case of two entities.

The symmetric matrix $G \epsilon \mu_R$ (n, n) is selected. That is, $G = G^T$ is considered to stand.

The center algorithm G and the secret algorithms $X_A$ and $X_B$ are determined as:

$$G(y_A) = X_A \quad (13\text{-}1)$$

$$G(y_B) = X_B \quad (13\text{-}2)$$

$$X_A(y_B) = x_A(\phi(y_B))^T \quad (14\text{-}1)$$

$$X_B(y_A) = x_B(\phi(y_A))^T \quad (14\text{-}2)$$

However, $$x_A = \phi(y_A) G \quad (15\text{-}1)$$

$$x_B = \phi(y_B) G \quad (15\text{-}2)$$

and $\phi$ is an algorithm which expresses the function from $\mu_R$ (1, n) to $\mu_R$ (1, n).

$$\phi(y_A), \phi(y_B), \phi(y_C), \ldots$$

is made linearly independent on the commutative ring R.

At this time, $$X_A(y_B) \tag{16}$$
$$= x_A(\phi(y_B))^T$$
$$= (\phi(y_A) G)(\phi(y_B))^T$$
$$= (\phi(y_A) G (\phi(y_B))^T)^T$$
$$= \phi(y_B) G^T (\phi(y_A))^T$$
$$= (\phi(y_B) G)(\phi(y_A))^T$$
$$= x_B(\phi(y_A))^T$$
$$= X_B(y_A)$$

That is, $$X_A(y_B) = X_B(y_A) \tag{17}$$

stands. Therefore, the value of the above equation may be made the cryptokey k to be shared.

As mentioned in detail above, according to a first aspect of the present invention, a cryptokey common with another party which has never been met (never been communicated with) may be computed simply and securely by just inputting the identifier of the other party, thus enabling easy communications by cipher text among any parties.

The above explanation concerned a shared cryptokey generation apparatus and a communication system using a shared cryptokey known as the "key predistribution system (KPS)" invented by the present inventors.

Summarizing the above generation of the cryptokey by stages, the generation may be roughly classified into the following three stages (steps):
 a. Step 1: Preparation of center algorithm
 b. Step 2: Preparation and distribution of secret algorithms for use by entities
 c. Step 3: Sharing of key by a group of the entities Step 1 is an operation required for starting up a system or renewing it. Assume the center is a center p. This refers to the generation of a special algorithm, that is, a center algorithm $G_P$ which just the center p holds secret. However, the agreement of all the entities or representatives of the entities is obtained regarding the method for generation of $G_P$.

Step 2 is an operation performed by the centers and entities when entities enter the network. Assume the entity is an entity i. The center p applies the center algorithm $G_P$ to the identifiers yi of the entity distinct to the same, made public, and used semifixedly so as to prepare the secret algorithms $X_{pi} = G_P(yi)$ exclusive for the entity. The secret algorithms $X_1i, X_2i, \ldots, X_Si$ for the entity i are separately, or in combination as combined by a suitable method, distributed to the entity i, for example, by IC cards, etc. The entity i keeps secret the sets of secret algorithms received or the combinations of the same $X_i$.

Step 3 is an operation performed by the group sharing the cryptokey after the completion of steps 1 and 2. The entities belonging to the group input the identifiers of all the entities belonging to the group other than their own to their own secret algorithms and thereby share the same cryptokey k. For example, when the entity A and entity B wish to share the cryptokey $k_{AB}$, they respectively compute $k_{AB}$ as follows:

$$k_{AB} = X_A^{(2)}(y_B) \tag{18-1}$$

$$k_{AB} = X_B^{(2)}(y_A) \tag{18-2}$$

Further, when entity A, entity B, and entity C wish to share a cryptokey $k_{ABC}$, they respectively compute $k_{ABC}$ as follows:

$$k_{ABC} = X_A^{(3)}(y_B, y_C) \tag{19-1}$$

$$k_{ABC} = X_B^{(3)}(y_C, y_A) \tag{19-2}$$

$$k_{ABC} = X_C^{(3)}(y_A, y_B) \tag{19-3}$$

Here, $X_i^{(e)}$ indicates a secret algorithm of an entity i used when a group consisting of e number of entities shares a key.

Next, mention will be made of the general security of the KPS.

In the KPS, when distributing the secret algorithms, it is necessary to properly authenticate (identify) the entity to which the secret algorithm is to be transferred. Proper authentication of the entity (confirmation of the right person) is a main precondition of all the code means, however, so the problem of entity authentication is not unique to the KPS.

The key shared by a group under the KPS (master key) is distinct to each group and does not change insofar as the center algorithm is not renewed. Therefore, the KPS may be said to be a system for sharing a master key. Even when the master key is divulged outside the group, it is impossible to change to a new master key. Therefore, it is desirable to renew the center algorithm after a suitable period. However, if a group of two entities is sharing a key and use is made of a secret algorithm $X_i^{(3)}$ for sharing of a key for a group of three entities, by switching suitable random numbers, for example, pseudo random numbers and random numbers by the "linear congruence" method, etc., it is possible for the two entities to share a different key each time. For example, the entity A and entity B can share the common key k such as $$k = X_A^{(3)}(y_B, r) \tag{20-1}$$

$$k = X_B^{(3)}(r, y_A) \tag{20-2}$$

using the random number r different from the identifiers of each entity.

Now then, in the KPS, data regarding the center algorithm is dispersed to the entities in the form of the secret algorithms Xi, so an individual entity or a number of cooperating entities can, by expending a suitable amount of computation, find the center algorithm or the secret algorithm $X_t$ or a part thereof for an entity other than the cooperating entities.

By having the secret algorithms embedded in some sort of apparatus which is physically protected and has a computing ability, for example, an IC card having a built-in CPU and memory, and having the entities are able to execute the same without knowing their own secret algorithms, the center algorithm and the secret algorithms $X_t$ of other entities or parts thereof will not be exposed. Therefore, in an environment where the physical security can be kept complete, any KPS is secure.

However, current IC cards and other forms of physical security cannot be said to be complete. In actuality, it is difficult to expect complete physical security, so measures such as making it necessary for a number of entities to collude (cooperate) to obtain sufficient data for determining the center algorithm or $X_t$ or parts thereof or making it such that even when sufficient data is obtained, it would take a tremendous amount of computation to obtain the center algorithm or $X_t$ or parts thereof will be demanded for a KPS. The former may be said to correspond to so-called unconditional security and the latter to so-called computational security.

Verification of unconditional security is in general not difficult, but verification of computational security cannot be easily performed at the present time without assumption of difficulties in resolving suitable problems such as with unique factorization in prime elements.

Figure 10:
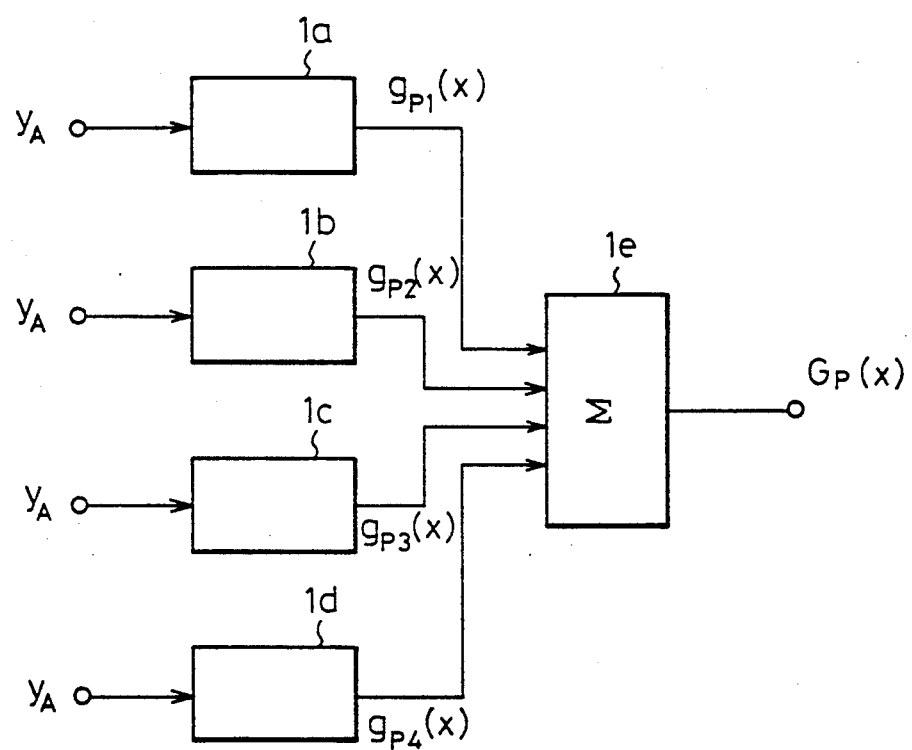
FIG. 10 is a general view showing another method for generation of the secret algorithm of the present invention for improving the security.

An explanation will now be given of the case of constructing an unconditionally secure KPS, in the sense of security so long as a certain number of entities do not collude, using the linear independence of vectors. In FIG. 10, first center algorithm generation apparatuses $1a$ to $1d$ in a plurality of mutually independent centers receive as input the identifier of entity A and generate first center algorithms $g_{p1}(x)$ to $g_{p4}(x)$ having a relationship of linear independence of vectors. Next, the apparatus $1e$ in the overall center combines the first center algorithms and generates the overall center algorithm $G_p(x)$. The secret algorithm $X_A$ of the entity A is generated based on the center algorithm $G_p(x)$ in the apparatus $1e$.

This system, of course, improves the security compared with the afore-mentioned embodiment using the secret algorithm, which was a case of one center. Below, a detailed explanation will be made of the means for expanding the KPS and improving the security based on linear algebra in the case of one center.

Figure 11:
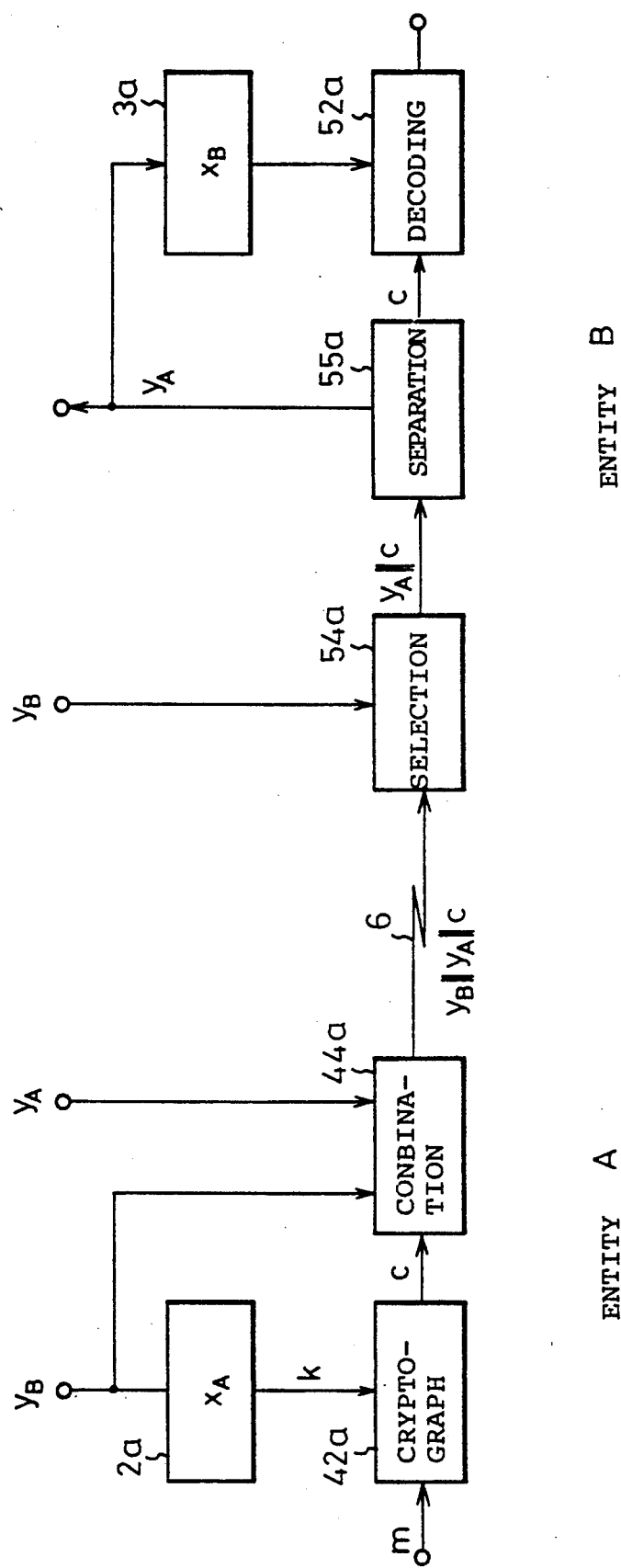
FIG. 11 is a block diagram of a shared cryptokey generation system and a communication system using the shared cryptokey of another preferred embodiment of the present invention.

FIG. 11 shows an example of application of a KPS illustrating schematically the constitution corresponding to FIG. 1. In the figure, the sending side entity A receives as input the identifier $y_B$ of the other party and applies the secret algorithm $X_A$ to generate the shared key k. Entity A then applies the same to the enciphering means $42a$ to generate a cipher text C from the message m. The combination means $44a$ combines the cipher text C, the other party's identifier $y_B$, and its own identifier $y_A$ and sends to the other party information comprised of the "addressee ($y_B$), sender ($y_A$), and cipher text (C)" via a transmission means (not shown) and a circuit (channel) 6. The receiving side entity B receives the transmitted data as input via a receiving means (not shown) and judges in the selection means $54a$ if the communication text is addressed to itself using its own identifier $y_B$. If the communication text is addressed to itself, it sends the other party's identifier $y_A$ and cipher text C to a separation means $55a$. The separation means $55a$ separates the other party's identifier $y_A$ and cipher text C. The other party's identifier $y_A$ is applied to an IC card or other cryptokey generation means $3a$ and the shared cryptokey k is generated via the secret algorithm $X_B$. The deciphering means $52a$ restores the message m from the transmitting side by applying the shared cryptokey k to the cipher text C.

In this way, by using the KPS, it is possible to simply realize mail communications such as in normal mail, i.e., one-directional cipher communications. Even when there are two or more addresses, it is possible to perform so-called "multiple address authentication" and mail communications. Note that, of course, this may also be applied to dialog type communications such as with telephones.

A description will now be given of a KPS based on linear algebra. The case of one center has already been discussed in the embodiment related to FIG. 1 to FIG. 8.

The system defined below will be named the "linear scheme".

Assume g is a prime number power and m, s, and h are non-negative integers. When the vector Q is ps ti $$Q = GF(q) \qquad (21)$$

the vector space formed by all the n-th dimensional row vectors on Q is expressed by $Q^m$.

Assume the entity is entity i and the identifier yi thereof is the element of the set I. Assume that if i does not equal j, then yi does not equal yj.

Further, $R_r$ is an algorithm which expresses the injection from I to $Q^m$ (one to one mapping).

The center, e.g., the center p, where $p = 1, 2, \ldots$ or s, selects independently from the other entities randomly and uniformly h number of m-th symmetric matrixes $G_{p1}, G_{p2}, \ldots G_{ph}$ on Q and generates the center algorithm $G_p$. $G_p$ is defined as an algorithm for generating the secret algorithm $X_{pi}$ for each $yi \in I$ $$X_{pi}(\xi) = xpiR_r(\xi)^T \qquad (22)$$

However, $X_{pi}$ is an h x m matrix on q defined by the following:

$$X_{pi} = \begin{pmatrix} R_r(yi)G_{p1} \\ R_r(yi)G_{p2} \\ \vdots \\ R_r(yi)G_{ph} \end{pmatrix} \qquad (23)$$

T means transposition. $\xi$ indicates a variable set for inputting an identifier yj of the other party.

The entity i acquires the algorithms $X_{pi}$ from the centers and produces from there the secret algorithms Xi exclusive for the entity i in the following way:

$$Xi(\xi) = xiR_r(\xi)^T \qquad (24)$$

$$Xi = \sum_{P=1}^{S} \times pi \qquad (25)$$

The center p must, it is important, transfer the algorithms $X_{pi}$ only to the entity i.

Note that if IC cards, etc., are used, it is possible to automatically obtain the secret algorithms Xi. For example, the entity i first obtains the IC cards, initializes them so that anyone can write on them but only the entity i can read them, transfers them to the centers, and has the centers input the $X_{pi}$, with the sums taken successively in the IC cards. Finally, at the stage of preparation of Xi, the IC cards are returned to the entity Xi.

If any case, in the end, the entity i holds the secret algorithms Xi.

When the entity i and entity j desire to share a cryptokey, the entity i calculates Xi(yj) as the key and the entity j calculates Xj(yi). Xi(yj) and Xj(yi) are both h-th dimensional column vectors on Q. That the two match can be easily derived from the definitions of Xi and Xj.

The above explanation was of the case where a group is comprised of two entities, but in general in the case of a group comprised of e number of entities ($e \geq 2$), the same system can be realized by use of multilinear mapping for the e number of entities instead of the aforementioned Gpi, e.e., the bilinear mapping.

Next, consider the security of the linear scheme. As attacks on the system, it is necessary to consider both attacks by the centers and attacks by the entities.

Complete breaking of the system would be equivalent to determining a matrix consisting of the matrixes $G_1$, $G_2, \ldots, G_h$ comprising $$Gj = \sum_{P=1}^{S} G_{pj}(j = 1, 2, \ldots, h) \quad (26)$$

the said matrix being:

$$G = [G_1, G_2 \ldots G_h] \quad (27)$$

Therefore, so long as all the centers do not collude, i.e., even if several centers collude, the center algorithm G cannot be determined completely. Therefore, none of the cryptokeys of any group can be determined at all.

Further, so long as rank G number of entities do not collude, the center algorithm G cannot be completely determined at all. The probability is large of rank G being m or a value close to m.

However, it is true that even with collusion of a number of entities less than rank G, the larger the number of colluding entities, the more the amount of data on G, and therefore, the more the amount of data on the secret algorithms of the entities that can be obtained. Therefore, the following conclusion is obtained when considering to what degree colluding entities can determine the cryptokeys of the other entities.

Assume the set of all the entities entered in the system is E. At this time, to satisfy the condition that:

"Even if all the entities belonging to the partial set $E_B$ of E collude, the cryptokey shared between any two entities belonging to $E - E_B$ cannot be determined at all,"

it is necessary and sufficient hat

"the vector $R_r(yi)$ for each $i \epsilon E - E_B$ be linearly independent from the set of the vectors $\{R(yi) | j \epsilon E_B\}$."

Therefore, it is possible to talk about this shifting the problem of security of collusion of the entities to the problem of linear independence in $$U = \{R_r(yi) | i \epsilon E\}$$

In particular, a close connection arises with the "theory of linear coding".

In actuality, if the linear code of n code length and m number of inspection symbols, which makes the matrix able to horizontally arrange the transposed vectors of all the vectors belonging to the set U of the vectors the parity inspection matrix, is made C, then "the existence of a coding word of Hamming weight w at C" and "the existence of a case where keys between other entities can be determined by collusion of (w−1) entities" are equivalent.

In particular, that "the minimum Hamming weight of C minimum distance be b+2 or more" is a sufficient condition for "any key among entities not being able to be determined at all by collusion of any b entities".

Therefore, the algorithm $R_r$ may be selected based on an algebraic/algebraic and geometric code theory. In this case, if yi is considered a suitable vector, $R_r(yi)$ becomes one which arranges a monomial for the component yi. Therefore, the algorithm X becomes a tuple. As the corresponding linear code, an (e)−GRM coding, BCH coding, RS coding, Goppa coding, etc., are used (Koh et al, "Coding Theory", Corona Co., 1975 (in Japanese)). However, evaluation of $R_r$ (computation) cannot be performed efficiently when m is large.

However, translating the theorum of Gilbert-Varsharmov in the coding theory into the KPS language, the following is obtained:

When the prime number power q and the non-negative integers m and b are given, $$\frac{M}{n} \leq \phi\left(\frac{b}{n}\right) \quad (28)$$

however, there is a linear scheme which satisfies $$\phi(X) = X\log_q(q - 1) - x\log_q X - (1 - x) \quad (29)$$
$$\log_q(1 - x)$$

and has b number or more allowable colluding entities, a storage capacity of the secret algorithms of $hm\log_{2q}$ (bit), and a total number of entities n. Here, h is any positive integer.

Further, it may be derived from the results of the coding theory that the majority of linear schemes have parameters satisfying equation (28).

Therefore, the algorithm for generating a reproducible affine random number series at a high speed may be selected as $R_r$.

In this regard, there is a difference from the usual method of use of linear coding. In usual application, due to the need to realize a deciphering algorithm with good efficiency, use is made of codes using some sort of structure, but in the linear scheme for the KPS, there is no need at all to consider the efficiency of the algorithm corresponding to the deciphering, so use may be made of random codes.

The results of the above study on the security of the linear scheme are summarized in Table 1.

TABLE 1

| | Target of attack | |
|---|---|---|
| Attack method | Complete breaking of system | Obtaining keys of other group |
| 1. Collusion of several centers | Impossible so long as all centers do not collude. | |
| 2. Collusion of several entities | Possible if rank G number or more of entities collude. Impossible if less than rank G number of entities collude. rank G m. | Possible if b + 1 number or more entities collude. Impossible if b number or less entities collude. b is determined by linear independence of set U. |
| 3. Collusion of several centers and several entities | Possible if all centers collude. Same as 2. when there are some centers not colluding. | |

Next, evaluation will be made of the various storage capacities and computation amounts for the linear scheme.

The centers tore the algorithm $R_r$ and h number of symmetric matrixes $G_{pi}, G_{p2}, \ldots G_{ph}$. When entities enter, they calculate $R_r(yi)$ and further multiply R(yi) with $G_{pi}, G_{p2}, \ldots G_{ph}$ to find Xpi, so the storage capacities and computation amounts shown in Table 2 are required. Table 2 shows the complexity of the linear scheme by the storage capacity and the computation amount.

TABLE 2

| Item | Storage capacity (bit) | Computation amount |
|---|---|---|
| Centers | [Storage capacity of $R_r$] + $\frac{1}{2}$hm(m + 1)log$_2$q | [Computation amount of evaluation of $R_r$] + Q computations O(hm$^2$) times |
| Entities | [Storage capacity of $R_r$] + hmlog$_2$q | [Computation amount of evaluation of $R_r$] + Q computations O(hm) times |
| Cryptokeys obtained | hlog$_2$q | |

Further, the entities store the algorithm $R_4$ and the matrix xi. When sharing keys, they calculate $R_r$(yi) and multiply $R_r$(yj)$^t$ to find the cryptokeys, so the storage capacities and computation amounts shown in Table 2 are required.

Note that when m and b are given, n, defined by the Gilbert-Varsharmov bound, can approximate $$n = m2^{m/b}$$

when b/n is small.

Examples of the values when q=2 and h=64 are shown in Table 3.

TABLE 3

| m | hm | hm$^2$ | b | n = b · $2^{m/b}$ | hn |
|---|---|---|---|---|---|
| $2^7$ | $2^{13}$ | $2^{20}$ | 2 | $2^{65}$ | $2^{71}$ |
| | | | $2^2$ | $2^{34}$ | $2^{40}$ |
| | | | $2^3$ | $2^{19}$ | $2^{25}$ |
| $2^{10}$ | $2^{16}$ | $2^{26}$ | $2^4$ | $2^{68}$ | $2^{74}$ |
| | | | $2^5$ | $2^{37}$ | $2^{43}$ |
| | | | $2^6$ | $2^{22}$ | $2^{28}$ |
| $2^{13}$ | $2^{19}$ | $2^{32}$ | $2^7$ | $2^{71}$ | $2^{77}$ |
| | | | $2^8$ | $2^{40}$ | $2^{46}$ |
| | | | $2^9$ | $2^{25}$ | $2^{31}$ |
| $2^{16}$ | $2^{22}$ | $2^{38}$ | $2^{10}$ | $2^{74}$ | $2^{80}$ |
| | | | $2^{11}$ | $2^{43}$ | $2^{49}$ |
| | | | $2^{12}$ | $2^{28}$ | $2^{34}$ |

From Table 3, it will be seen that when for example, $m=2^{13}$ and $b=2^8$, with a linear scheme where the centers store about 4 Gbits and the entities store about 512 Kbits, breaking the system as a whole would require collusion of all of the centers or collusion of about 8192 or more entities. Since it is impossible to determine the key among two entities even with the collusion of up to 256 other entities, 64 bits of keys can be shared among any two entities among the up to about $2^{40}(=10^{12})$ entities. As opposed to this, when the primitive system is taken of sharing in advance a key with all entities, the entities must store about 64 Tbits (1[Tbit] = 1024[Gbit]).

To study the features of the KPS based on the present invention, let us compare other conventional systems.

Figure 12A:
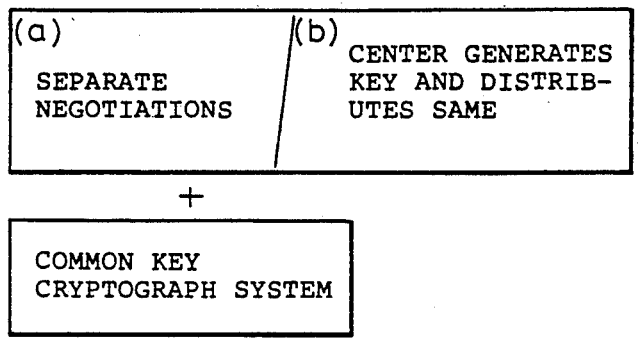
FIGS. 12(a) to (c) are general views of a conventional common key enciphering system, a conventional public key system, and a key predistribution system based on the present invention, respectively.
Figure 12B:
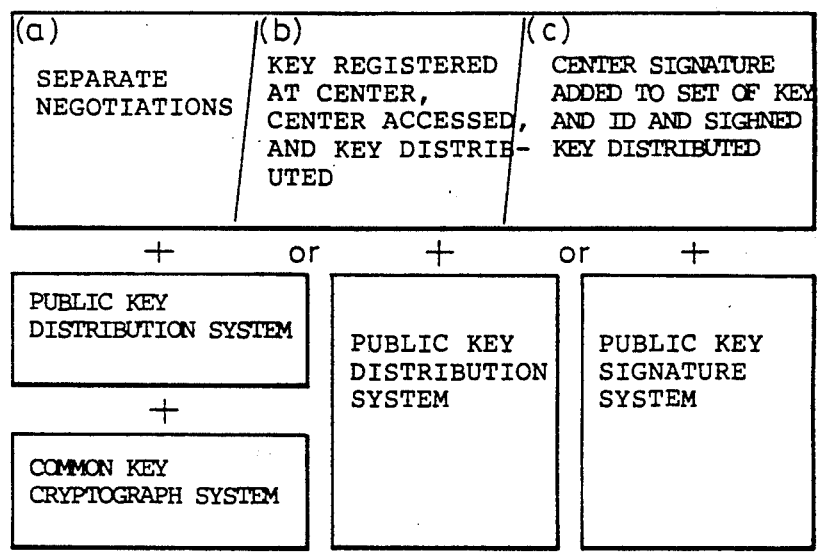

In the past, for cipher communications, use has been made of the common key enciphering system shown in FIG. 12 (a) and the public key systems shown in FIG. 12(b). FIG. 12(b) shows, from left to right, the public key distribution system, public key enciphering system, and public key signature system.

Figure 12C:
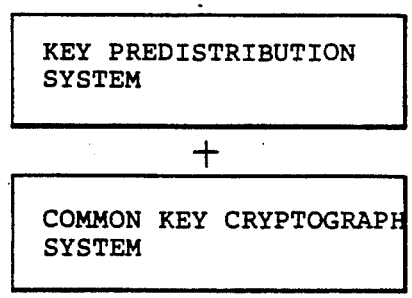

On the other hand, the KPS based on the present invention may be schematized as shown in FIG. 12(c). Table 4 shows the results of a comparison of the above systems. In Table 4, systems I a and b correspond to (a) and (b) in FIG. 12a, systems II a, b, and c correspond to (a), (b), and (c) in FIG. 12(b), and system III shows the KPS of the present invention of FIG. 12(c). For the evaluation, the complexity of the entities is shown. For the storage capacity, there is the amount of communications upon entry into the system: communications amount (1), the amount of communications for preparation of cipher communications: communications amount (2), and the amount of computations for the preparation of cipher communications. Further, for the evaluation of the center side, the necessity of the center (yes, no), center load, "big brother" nature of the center (BB), and difficulty of mail communications are given.

From Table 4, it will be understood that the KPS of the present invention is superior overall to other conventional system with regard to cipher communications among large numbers of unspecified entities.

TABLE 4

| | | | Complexity | | | Center | | | Mail |
|---|---|---|---|---|---|---|---|---|---|
| System | | Storage capacity amount | Communications amount (1) | Communications amount (2) | Computation am't | Present | Load | BB | communications |
| I | a | Large O(n) | Large O(n) with σ & α | None | None | No | — | — | Possible |
| | b | Small O(1) | Small O(1) with σ & α | Small O(1) with σ & α | None | Yes | Large | Large | Difficult |
| II | a | Large O(n) | Large O(n) with α | None | None/small | No | — | — | Possible |
| | b | Small O(1) | Small O(1) with α | Small O(1) with α | None/small | Yes | Large | Med. | Difficult |
| | c | Small O(1) | Small O(1) with α | Small O(1) with α | None/small | Yes | Small | Med. | Difficult |
| III | | Medium O(m) | Medium O(S) + with | None | Small | Yes | Small | Yes++ | Possible |

TABLE 4-continued

| | | | Complexity | | | | |
|---|---|---|---|---|---|---|---|
| | | | | | Center | | Mail |
| | Storage | Communi-cations | Communi-cations | Com-puta- | | | communic- |
| | capacity | amount | amount | tion | Pre- | | |
| System | amount | (1) | (2) | am't | sent | Load BB | cations |
| σ & α | | | | | | | |

(Note)
n: Total number of entities of network
S: Number of centers
m: Security parameters
σ: Secrecy required
α: Authenticity required
+: Reducible to O(1)
++: Sufficiently small by increasing S Above, a detailed explanation was made of the linear scheme for KPS.

There may be other methods for realization of KPS besides the linear scheme. For example, it is conceivable to construct the center algorithm as an obscure algorithm by the algorithm generation method. For details on the obscure algorithm generation method, see the afore-mentioned references.

We claim:

1. A common cryptokey generation system for generating a common cryptokey to be used in securely communicating text from a first entity to a second entity, the first and second entities being remote from one another and having respective unique first and second entity indentifiers, the system comprising:
   algorithm generation means for transforming the entity identifiers into a center algorithm, and for using the center algorithm to generate first and second algorithms uniquely corresponding to the respective first and second entities; and
   first and second cryptokey generation means associated with the respective first and second entities and remote from each other for generating the common cryptokey, each of the first and second cryptokey generation means having storage means for storing the respective first and second algorithms and processing means operatively coupled to the storage means for processing the respective first and second algorithms in combination with the respective second and first entity identifiers to generate the common cryptokey.

2. A common cryptokey generation system according to claim 1, wherein at least one of the first and second cryptokey generation means includes a semiconductor integrated circuit apparatus.

3. A common cryptokey generation system according to claim 1, wherein the algorithm generation means include identifier transformation means for transforming each of the first and second entity identifiers to corresponding elements of a linear space.

4. A common cryptokey generation system for generating a common cryptokey to be used in securely communicating text from a transmitting entity to a plurality of receiving entities, each of the transmitting and receiving entities being remote from one another and each entity having a unique entity identifier, the system comprising:
   algorithm generation means for transforming the entity identifiers into a center algorithm, and for using the center algorithm to generate a plurality of entity algorithms, each of the entity algorithms uniquely corresponding to one of the entities; and
   a plurality of cryptokey generation means, each of the cryptokey generation means being uniquely associated with one of the transmitting and receiving entities and remote from others of the cryptokey generation means, for generating the common cryptokey, each of the cryptokey generation means having storage means for storing the corresponding entity algorithm and processing means operatively coupled to the storage means for processing the corresponding entity algorithm in combination with the entity identifiers of others of the entities to generate the common cryptokey.

5. A common cryptokey generation system according to claim 4, wherein the algorithm generation means include identifier transformation means for transforming each of the transmitting and receiving entity identifiers to corresponding elements of a linear space.

6. A common cryptokey generation system according to claim 4, wherein:
   the storage means of each of the cryptokey generation means stores cipher text and a plurality of entity identifiers including its own entity identifier and the processing means of each of the cryptokey generation means uses the identifiers to confirm that the cipher text is addressed to that entity, extracts the transmitting entity identifier and applies the transmitting entity identifier to the cryptokey generation means of that entity to generate the common cryptokey.

7. A common cryptokey generation system according to claim 4, wherein the algorithm generation means include a plurality of algorithm generation apparatuses which operate mutually independently to respectively generate a plurality of independent first center algorithms and a combining apparatus operatively coupled to the algorithm generation apparatuses for combining the plurality of first center algorithms to generate the entity algorithms.

8. A common cryptokey generation system according to claim 7, wherein each of the first center algorithms corresponds to a vector linearly independent with respect to others of the vectors, and the algorithm generation means maintain the linear independence of the vectors.

9. A common cryptokey generation system according to claim 7, wherein the algorithm generation means generates the first center algorithms using an algorithm combination method.

10. A common cryptokey generation system according to claim 9, wherein each of the first center algorithms corresponds to a vector linearly independent with respect to others of the vectors, and the algorithm generation means maintain the linear independence of the vectors.

11. A common cryptokey generation system for generating a common cryptokey to be used in securely communicating text from a first entity to a second entity, the first and second entities being remote from one another and having respective unique first and second entity identifiers, the first entity having an enciphering device for enciphering the text according to the common cryptokey and transmitting a message including the enciphered text and the first and second entity identifiers, and the second entity having a deciphering device for receiving and deciphering the message according to the common cryptokey, the system comprising:

algorithm generation means for transforming the first and second entity identifiers into a center algorithm, and for using the center algorithm to generate first and second algorithms uniquely corresponding to the respective first and second entities;

first cryptokey generation means operatively coupled to the enciphering device for generating the common cryptokey in response to an externally-applied command, the first cryptokey generation means including first storage means for storing the first entity algorithm and first processing means operatively coupled to the first storage means and to the enciphering device for processing the first entity algorithm in combination with the second entity identifier to generate the common cryptokey and for communicating the common cryptokey to the enciphering device; and second cryptokey generation means operatively coupled to the deciphering device and remote from the first cryptokey generation means for generating the common cryptokey, the second cryptokey generation means including second storage means for storing the second entity algorithm and second processing means operatively coupled to the second storage means and to the deciphering device for processing the second entity algorithm in combination with the first entity identifier to generate the common cryptokey and for communicating the common cryptokey to the deciphering device.

12. A common cryptokey generation system for generating a common cryptokey to be used in securely communicating text from a transmitting entity to a plurality of receiving entities, each of the transmitting and receiving entities being remote from one another and having a unique entity identifier, the transmitting entity having an enciphering device for enciphering the text according to the common cryptokey and transmitting a message including the enciphered text, the transmitting entity identifier, and the entity identifiers of the receiving entities, and each of the receiving entities having a deciphering device for receiving and deciphering the message according to the common cryptokey, the system comprising:

algorithm generation means for transforming the transmitting and receiving entity identifiers into a center algorithm, and for using the center algorithm to generate a first algorithm uniquely corresponding to the transmitting entity and a plurality of second algorithms uniquely corresponding to the respective receiving entities;

transmitting entity cryptokey generation means operatively coupled to the enciphering device for generating the common cryptokey in response to an externally-applied command, the transmitting entity cryptokey generation means including first storage means for storing the first algorithm and first processing means operatively coupled to the first storage means and to the enciphering device for processing the first algorithm in combination with the entity identifiers of the receiving entities to generate the common cryptokey and for communicating the common cryptokey to the enciphering device; and a plurality of receiving entity cryptokey generation means, each of the receiving entity cryptokey generation means being associated with one of the receiving entities and being remote others of the transmitting and receiving entity cryptokey generation means, for generating the common cryptokey, each of the receiving entity cryptokey generation means having second storage means for storing one of the plurality of second algorithms uniquely corresponding to the respective receiving entity and second processing means operatively coupled to the second storage means and to the deciphering device for processing the one of the second algorithms in combination with the entity identifiers of the transmitting entity identifier and others of the receiving entities to generate the common cryptokey.

13. A method for generating a common cryptokey to be used in securely communicating text from a first entity to a second entity, the first and second entities being remote from one another and having respective unique first and second entity identifiers, the method comprising:

transforming the entity identifiers into a center algorithm, and using the center algorithm to generate first and second algorithms uniquely corresponding to the respective first and second entities;

prestoring the first and second algorithms at the respective first and second entities;

at the first entity, in response to an externally-applied command, processing the first algorithm in combination with the second entity identifier to generate the common cryptokey, enciphering the text using the common cryptokey, and transmitting a message including the enciphered text and the first and second entity identifiers to the second entity; and at the second entity, processing the second algorithm in combination with the first entity identifier to generate the common cryptokey, and deciphering the enciphered text with the common cryptokey at the second entity.

14. A method according to claim 13, wherein the center algorithm includes a plurality of first center algorithms, each of the first center algorithms corresponding to a vector that is linearly independent of others of the vectors, and the entity algorithm generation step includes combing the plurality of first center algorithms to generate the entity algorithms.

15. A method for generating a common cryptokey to be used in securely communicating text from a transmitting entity to at least one of a plurality of receiving entities, each of the transmitting and receiving entities being remote from one another and having a unique entity identifier, the method comprising:

transforming the transmitting and receiving entity identifiers into a center algorithm, and using the center algorithm to generate a first algorithm uniquely corresponding to the transmitting entity and a plurality of second algorithms uniquely corresponding to the respective receiving entities;

prestoring the first algorithm at the transmitting entity and prestoring the second algorithms at the respective receiving entities;

at the transmitting entity, in response to an externally-applied command, processing the first algorithm in combination with the receiving entity identifiers of the at least one receiving entity to generate the common cryptokey, using the common cryptokey to encipher the text, and transmitting to the at least one receiving entity a message including the enciphered text and the entity identifiers of the transmitting entity and the at least one receiving entity; and at each of the at least one receiving entities, processing the second algorithm corresponding to that receiving entity in combination with the transmitting entity identifier and the entity identifier for the at least one receiving entity to generate the common cryptokey.

16. A method according to claim 15, wherein the center algorithm includes a plurality of first center algorithms, each of the first center algorithms corresponding to a vector that is linearly independent of others of the vectors, and the entity algorithm generation step includes combining the plurality of first center algorithms to generate the entity algorithms.

17. A common cryptokey generation system comprising:
- a secret algorithm generation apparatus for using a plurality of unique entity identifiers corresponding to a plurality of respective entities to generate a center algorithm, and for using the center algorithm to generate a plurality of secret algorithms each uniquely corresponding to one of the plurality of respective entities; and
- a plurality of cryptokey generation means respectively associated with the entities for generating a common cryptokey, each of the cryptokey generation means storing an associated one of the secret algorithms, at least one of the cryptokey generation means generating the common cryptokey by applying to the associated secret algorithm at least one of the entity identifiers.

18. The common cryptokey generation system according to claim 17, wherein the cryptokey generation means include means for storing a corresponding one of the secret algorithms.

19. The common cryptokey generation system according to claim 17, wherein at least one of the cryptokey generation means comprises an integrated circuit card.

20. A common cryptokey generation system according to claim 17, wherein the algorithm generation means include identifier transformation means for transforming each of the entity identifiers to corresponding elements of a linear space.

21. A method for generating a common cryptokey, comprising:
- using a plurality of unique entity identifiers corresponding to a plurality of respective entities to generate a center algorithm, and using the center algorithm to generate a plurality of secret algorithms each uniquely corresponding to one of the plurality of respective entities; and
- at each of a portion of the entities, applying to the secret algorithm for that entity the identifier of at least one of the entities of the portion other than that entity to generate the common cryptokey.

22. The common cryptokey generation method according to claim 21, wherein the center algorithm is generated using a linear scheme.

23. The common cryptokey generation method according to claim 21, wherein generation of the center algorithm includes combining a plurality of first center algorithms, each of the first center algorithms corresponding to one of the entities.

24. A cryptographic communication system including a center and a group of entities which communicate with each other using a common cryptokey, each of the entities having a unique identifier, the system comprising:
- algorithm generation means located at the center for transforming the entity identifiers into a center algorithm, and for using the center algorithm to generate a plurality of secret algorithms corresponding to respective ones of the entities by applying the respective identifiers to the center algorithm; and
- a plurality of cryptokey generation means uniquely corresponding to and located at the respective ones of the entities for generating the common cryptokey, each of the cryptokey generation means applying to the corresponding secret algorithm the identifier of at least one of the other entities.

25. A common cryptokey generation system according to claim 24, wherein the algorithm generation means include identifier transformation means for transforming each of the entity identifiers to corresponding elements of a linear space.

* * * * *